United States Patent [19]

Nard et al.

[11] 4,297,700
[45] Oct. 27, 1981

[54] METHOD AND APPARATUS FOR MEASURING DISTANCES

[75] Inventors: Georges Nard, Nantes; Jean Rabian, Ste. Luce; Michel Rouaud, Thouare, all of France

[73] Assignee: Societe d'Etudes, Recherches et Constructions Electroniques Sercel, Carquefou, France

[21] Appl. No.: 762,729

[22] Filed: Jan. 26, 1977

Related U.S. Application Data

[63] Continuation of Ser. No. 517,157, Oct. 22, 1974, abandoned.

[30] Foreign Application Priority Data

Oct. 23, 1973 [FR] France ................................ 73 37740

[51] Int. Cl.³ ............................................ G01S 13/80
[52] U.S. Cl. ................................................. 343/6.5 R
[58] Field of Search ...................... 343/6.5 R, 6.5 LC

[56] References Cited

U.S. PATENT DOCUMENTS

| | | | |
|---|---|---|---|
| 3,521,279 | 7/1970 | Michnik | 343/6.5 LC |
| 3,530,467 | 9/1970 | Altwood et al. | 343/6.5 LC X |
| 3,530,470 | 9/1970 | Sheftelman et al. | 343/6.5 LC |
| 3,531,801 | 9/1970 | Huebscher | 343/6.5 R X |
| 3,573,819 | 4/1971 | Mason et al. | 343/6.5 R |
| 3,659,292 | 4/1972 | Martin et al. | 343/6.5 R |
| 3,755,811 | 8/1973 | Breckman | 343/6.5 R |
| 3,900,873 | 8/1975 | Bouvier et al. | 343/6.5 R X |
| 3,945,006 | 3/1976 | Cleeton | 343/6.5 R X |

*Primary Examiner*—Malcolm F. Hubler
*Attorney, Agent, or Firm*—Schwartz, Jeffery, Schwaab, Mack, Blumenthal & Koch

[57] ABSTRACT

Measurement of distance is carried out by transmitting a VHF wave train comprising a sinusoidal signal modulated by phase inversion in accordance with a pseudo-random sequence, at a receiver shifting a like second sequence until it coincides with the received sequence, re-transmitting a signal modulated by the second sequence, receiving the second sequence and shifting a like third sequence until it coincides with the received second sequence, and measuring the phase shift between the third sequence and a like reference sequence.

14 Claims, 17 Drawing Figures

LOCAL SEQUENCE TO BE SYNCHRONISED
RECEIVED SEQUENCE

Fig.13B

COINCIDENCE

Fig.13A

COINCIDENCE

Fig.14

INTERROGATOR (CIRCUIT 325)
END OF SEQUENCE PULSES
RESPONDER (1) (CIRCUIT 315A)
RESPONDER (2) (CIRCUIT 315B)

3 POSITION CIRCULAR MODE

3 FIXED RESPONDERS R1,R2,R3

1 TO 3 MOBILES
    INTERROGATORS

Fig.15

2 POSITION HYPERBOLIC MODE

3 FIXED TRANSMITTING STATIONS { 1 MASTER (TRANSMITTER); 2 SLAVES { RECEIVER; TRANSMITTER }

ANY NUMBER OF MOBILE RECEIVERS

MOBILE { RECEIVER-CALCULATOR; MEASUREMENTS $D_0-D_1$ AND $D_0-D_2$

POINT: LONGITUDE
       LATITUDE

Fig.16

METHOD AND APPARATUS FOR MEASURING DISTANCES

This is a continuation of application Ser. No. 517,157, filed Oct. 22, 1974, now abandoned.

The invention concerns an aid to distance measurement, more particularly for determining the position of a mobile object with respect to fixed references.

A certain number of position-determining systems have been proposed, in which the transit time of a pulse, travelling on a carrier wave between a fixed reference and a moving object, is measured. Assuming that the speed of propagation of the waves is known, information is thus obtained concerning the distance from the fixed reference to the said mobile object.

Although fairly widely used, these systems can only provide satisfactory precision if the radio-electric power concentrated in the pulse transmitted on the carrier wave is sufficient. More exactly, this precision is related to the signal-noise ratio on reception, which is known to depend precisely on the transmission power.

This results in the need to concentrate a very high transmission power in the form of a pulse which must be as rigid as possible.

In addition to the technical difficulties which this involves, such a transmission results in the limits of utilisation of electronic components being rapidly reached.

The invention proposes new aid methods and devices for distance measuring which require moderate transmission powers, while permitting excellent precision.

According to the invention, a method of aiding distance evaluation is proposed of the type using the transmission of an electromagnetic wave modulated by phase inversion according to a pseudo-random sequence, between at least two transmitters and at least two receivers, characterised by the following operations:

At a first transmitter:
transmitting a first UHF high-frequency wave train comprising a sinusoidal signal modulated by phase inversion according to a first repetitive chain of a known pseudo-random sequence, at a first receiver associated with a second transmitter:
receiving the first high-frequency wave train and demodulating it by correlation of the first repetitive chain of the known pseudo-random sequence, which chain is received, with a local second repetitive chain of the same pseudo-random sequence, the said second repetitive chain being shifted with respect to time until it is made to coincide with the first repetitive chain received, and at the second transmitter, transmitting a second high-frequency wave train comprising a sinusoidal signal modulated by phase inversion according to the second local repetitive chain of the pseudo-random sequence thus shifted, once reception of the first wave train is concluded, at a second receiver:
receiving at least the second high-frequency wave train and demodulating it by correlation of the second repetitive chain of the known pseudo-random sequence, which chain is received carried by the wave train, with a third local chain of the same pseudo-random sequence, the said third repetitive chain being shifted with respect to time until it is caused to coincide with the second repetitive chain received, finally, also at the second receiver, producing another local repetitive chain of a pseudo-random frequency and measuring the shift with respect to time between the third repetitive chain and the said other repetitive chain, and repeating sequentially these operations such that the transmission instants of the first and second wave trains remain disjointed.

More precisely, the transmission comprises the modulation by phase inversion of a signal having a first frequency (38 Mc/s for example), then passage through amplification at a transmission carrier frequency appreciably higher (420-450 Mc/s for example).

Under these conditions, reception comprises reciprocal operations of frequency changing and amplification. Then the phase inversion demodulation comprises according to the invention a correlation followed by a demodulation properly so-called in single side band and re-amplification.

By means of a suitable integrating filtration, there is thus obtained information which represents the correlation between the received pseudo-random sequence and a locally generated pseudo-random sequence.

In a first search operation the local pseudo-random sequence is then displaced progressively until coincidence in time of this local pseudo-random sequence with the received pseudo-random sequence is obtained.

After this search operation, the repetition of the pseudo-random sequence of the receiver may be regarded as a local time base, connected to the propagation time of the electromagnetic wave from the transmitter to the receiver considered.

Very advantageously, after this operation of coincidence search a coincidence tracking operation is carried out, in the course of which the local pseudo-random sequence is adjusted as precisely as possible with respect to the received pseudo-random sequence. This tracking is preferably made by means of a "phase shift measurement".

The precise local timebase thus obtained at the receiver is effectively connected to the propagation distance of the electromagnetic wave. However, since it is most often necessary to consider that the initial time base of the transmitter is unknown at the level of the receiver, it is admitted that it is impossible to obtain the propagation distance from the local time base of the receiver, after the single transmitter-receiver passage.

One way of solving this difficulty is to cause the electromagnetic wave to pass over a closed-circuit path, or over several different paths between the same point of departure and the same point of arrival, provided only that one of the points concerned in these passages is mobile.

Since these different passages on the same electromagnetic frequency have to be separated, they cannot take place in the same time. Consequently, the transmissions will be carried out in a manner multiplexed in time; this multiplexing is defined by a "transmission time shape".

Under these conditions, it is advantageous that each transmitter and each receiver comprises a generator producing an uninterrupted repetitive chain of a pseudo-random sequence. This generator then serves as memory or store for the information of time connected to the propagation distance, and the store function thus obtained makes it possible to preserve transmit time information in the course of the time multiplexing. It may be noted, however, that it suffices to provide in each transmitter or receiver a clock adjusted very precisely to the end of the pseudo-random sequence, provided that the form of the pseudo-random sequence is known everywhere.

In a first embodiment, a closed-circuit path is obtained by means of a passage there and back between an interrogator and a responder; in a second embodiment, a first path goes directly from a transmitting station to a mobile receiver, and a second path goes from the fixed transmitting station to a slave transmitting station, also fixed, then from this slave transmitting station to the mobile receiver.

In the first embodiment, two fixed responders are each provided with a receiver-transmitter, the purpose of which is to retransmit the pseudo-random sequence it receives with a time lag equal to or a multiple of the period of the sequence.

A mobile object, for example a ship on the point of entering a port, possesses a transmitter and a two-channel receiver. Initially, the transmitter radiates the same known pseudo-random sequence; the responders receive it at the same time, then send it back each in turn according to a known time shape.

The two-channel receiver of the mobile object then receives the known pseudo-random sequence, successively retransmitted by one or the other of the responders.

The time shift between the pseudo-random sequence as transmitted from the mobile object, and the same pseudo-random sequence as received after travelling to and from the two responders is a linear function of the distances from the mobile object to the said responders.

This position determination is of circular type since the distance from a mobile object to a point is obtained directly. This circular method can be saturated because the number of mobile objects is limited, particularly by the possibilities of time shaping.

In the second embodiment, at a fixed point a station is installed transmitting periodically a known pseudo-random sequence; at another fixed point a receiver-transmitter (similar to a responder of the first embodiment) receives this pseudo-random sequence and retransmits it in a known relative time relation with regard to the transmissions of the first fixed point.

A mobile object is then equipped simply with a two-channel receiver, utilising successively the transmissions coming from the first and second fixed points to obtain on each channel a local pseudo-random sequence as received from the transmitter corresponding to this channel.

The time lag between the two pseudo-random sequences obtained in this way is a known linear function of the difference of the distances from the mobile object to the two transmitters; this is position determination by means of lines or hyperbolic loci.

As is well known in the art, the hyperbolic loci are necessary, that is to say, twice the elements described above for position finding to be possible; in this case, the number of receivers is unlimited.

It is quite clear that in all the foregoing, the carrier frequencies of the transmitters and receivers working together are normally the same, and that it is possible to conceive completely separate systems using different frequencies.

Furthermore, it is often advantageous to obtain a redundance of information, for example by using three fixed responders in the first embodiment (saturatable circular embodiment), or three pairs of transmitting stations in the second embodiment (non-saturatable hyperbolic embodiment).

The invention also concerns a transmitter, a receiver, a receiver-transmitter (or responder), a transmitter-receiver or interrogator, in which the transmission and one or more reception channels are furthermore completely separated, and finally a receiver having several separate channels.

Other features and advantages will appear from the following detailed description with reference to the accompanying drawings, given solely as non-restrictive examples in which.

Figure 1:
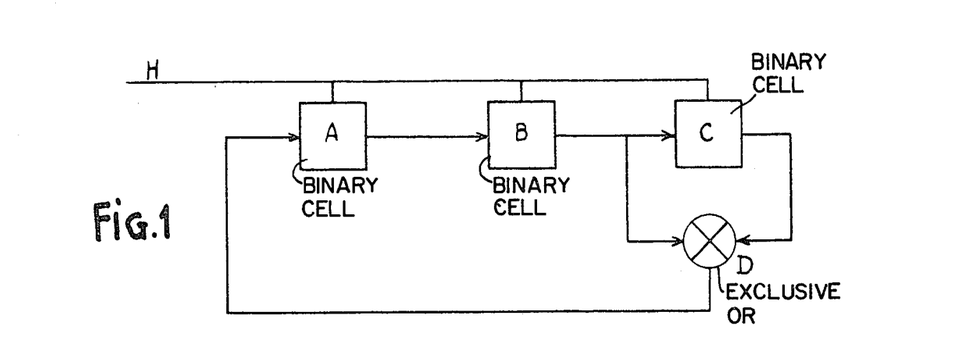
FIG. 1 illustrates the diagram of a known electric circuit capable of generating pseudo-random sequences from clock pulses H.

In FIG. 1, three binary cells A, B, C each receive clock pulses H and are connected to form a shift register. A logical combination of the outputs of at least two of the binary cells (B and C in the circumstances) is formed in a combination logical element D, the output of which is returned to the input of the first binary cell A.

Figure 2:
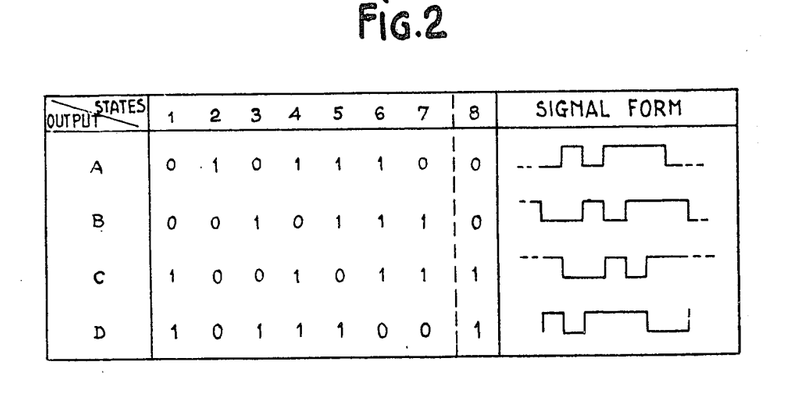
FIG. 2 illustrates the binary states and corresponding signal forms for different pseudo-random signals, capable of being obtained by means of the sequence generating circuit of FIG. 1.

If the combination logical element D is an EXCLUSIVE-OR circuit, the outputs of the binary cells A, B, C and of the element D may be developed in the manner illustrated in FIG. 2, on the one hand by means of binary levels in the left-hand part of this figure, and on the other hand by means of the corresponding signal form in the right-hand part of the figure.

It will be seen in FIG. 2 that at the 8th clock time, the states of the outputs of the elements A, B, C, D have become the same as in the first clock time.

It is in fact known that if P is the highest rank among those of the binary cells involved in the logical combination, the periodicity of the pseudo-random sequences is $2^P-1$ clock pulses, and that it is possible to obtain the same number of different pseudo-random sequences.

In FIG. 2, the period of the sequences is effectively equal to $2^3-1$, that is to say 7 clock pulses. The different pseudo-random sequences are deduced from one another by simple time lag. In this connection, it is very important to understand that in what follows herein only a single one of the possible known pseudo-random forms of sequences is of interest, which implies that the commencement (or end) of the sequence is well determined.

Figure 3:
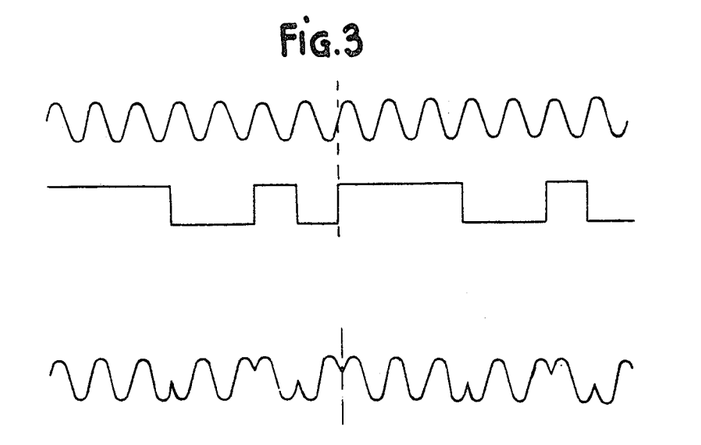
FIG. 3 is a time diagram showing how it is possible to modulate in known manner a sinusoidal signal by phase inversion from a pseudo-random signal, the period of the sinusoidal signal being equal to the duration of the binary element of the pseudo-random sequence.

The middle portion of FIG. 3 illustrates a repetitive chain formed of twice the same pseudo-random sequence. In the top part of this FIG. 3 is a sinusoidal signal having a period equal to the duration of the binary element of the pseudo-random sequence shown opposite. The bottom part of FIG. 3 illustrates a known type of modulation by phase inversion of the sinusoidal signal according to the repetitive chain of the pseudo-random sequence.

Pseudo-random sequences are described in principle in the document "Shift register sequences", Salomon W. Golumb, Norman Abranson, San Francisco, 1967. Other descriptive elements on pseudo-random sequences, and particularly on modulation by phase inversion such as that represented in FIG. 3 are available in French Pat. No. 7,031,956, published under No. 2,102,838, which however describes quite a different application.

With reference to FIGS. 4 to 14 the first embodiment of the invention of saturatable circular type will now be described.

Figure 4:
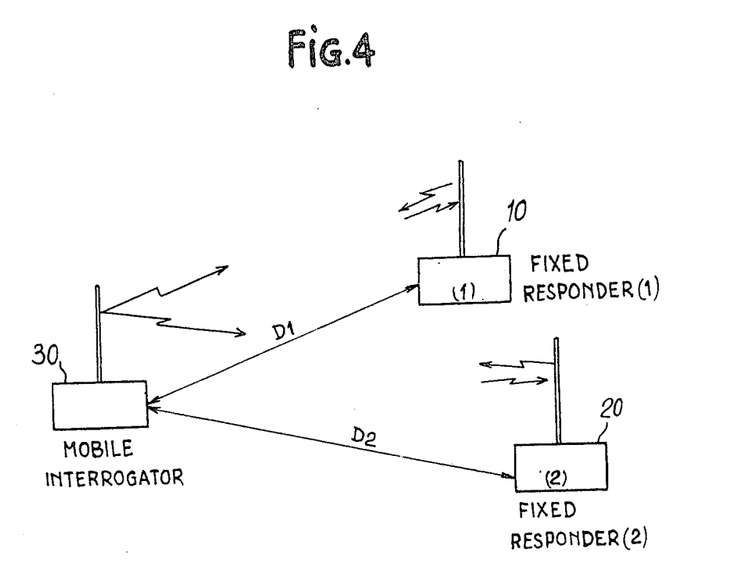
FIG. 4 illustrates very diagrammatically the geographical positioning of a mobile object with respect to two fixed responders (1) and (2) for the first embodiment of the invention.

As shown in FIG. 4, the first embodiment employs two fixed responders 10 and 12, implanted for example at two known places at the approaches of a port, and a mobile interrogator 30, arranged for example on board a ship preparing to enter the port; naturally the fixed responders of the port have a known reception-transmission carrier frequency. The mobile interrogator is then on the same transmission-reception frequency.

Figure 5:
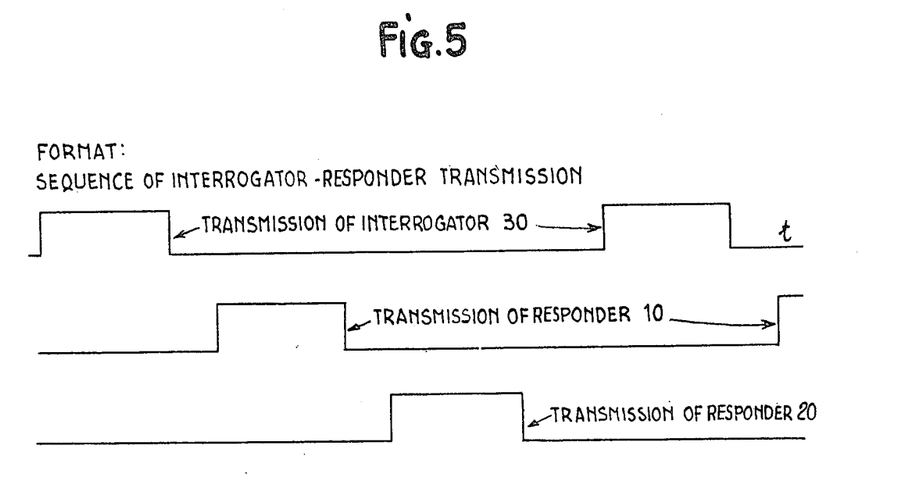
FIG. 5 illustrates the time form or sequence of transmissions between the mobile interrogator and the two responders of FIG. 4.

As shown by the time signals of FIG. 5, the interrogator 30 radiates repetitively a known pseudo-random sequence during its transmission segments (first line of FIG. 5). It will be seen later how this transmission of a known pseudo-random sequence is effected. During this time, each of the two responders 10 and 20 acts on its sequence generating circuit for producing a pseudo-random sequence synchronised with respect to that of the mobile interrogator 30 as received. The duration of a transmission segment of interrogator 30 is equal to a first whole number of periods of the pseudo-random sequence. These transmission segments are repeated with a periodicity of value equal to a second whole number of periods of the sequence.

Then, as shown by the other two lines of FIG. 5, each responder retransmits in turn its local pseudo-random sequence thus synchronised. In the mobile interrogator 30, a two-channel receiver can then also synchronise two independent local sequence generation on the two pseudo-random sequences as they return from one and the other of the two responders, respectively and successively.

It will be understood that the shifts between each of these two latter local sequence generators, and the initial sequence generator, which has produced the sequence transmitted by the interrogator 30, are bound up in known manner with the distance from the mobile interrogator to each of the responders (more exactly with double these distances, since there is go-and-return). This therefore permits the measurement of the two distances.

It is already clear that the structure of the responders is simpler than that of the interrogators; for this reason, the responder 10 will first be described with reference to FIGS. 6, 8 and 9.

A responder should first of all receive and then transmit; the reception part of the responder 10 will therefore be described first.

Figure 6:
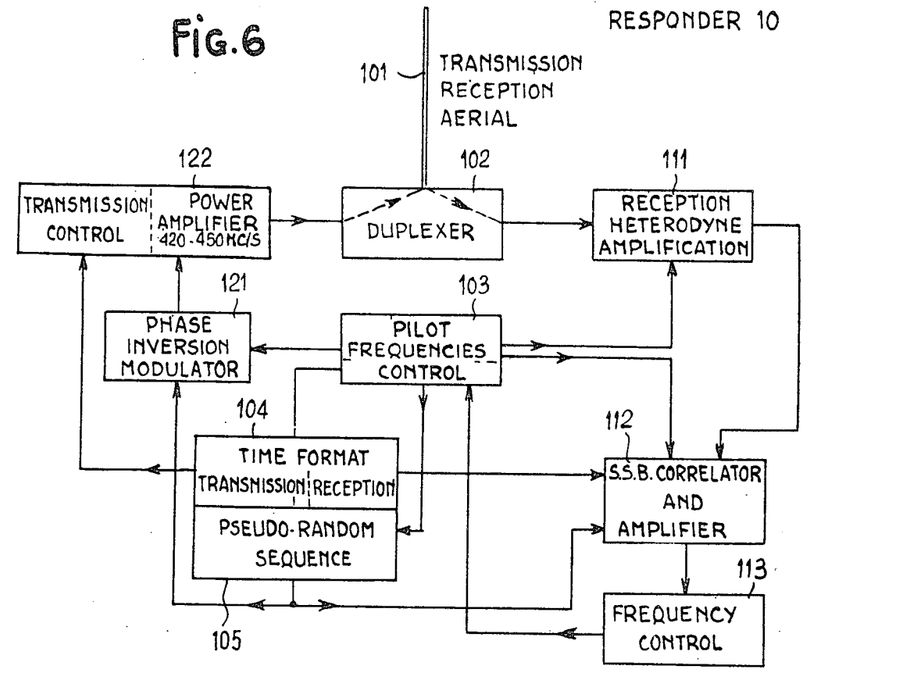
FIG. 6 illustrates the basic block diagram of one of the responders of FIG. 4.

In FIG. 6, the responder 10 comprises an aerial 101 for transmission-reception connected to a duplexer 102, provided for separating the transmission part from the reception part.

The responder 10 also comprises a source 103 of pilot frequencies, of which at least one is controlled in a manner to be described later. It also comprises a forming or shaping circuit 104 for producing shaped time signals. This production of shaped time signals is effected from pilot frequencies (not controlled) of source 103 by means of logic circuits and counters in a manner known per se.

From the controlled pilot frequency or frequencies of source 103, a circuit 105 generates a pseudo-random sequence. For this purpose, the circuit 105 comprises a structure similar to that of the circuit of FIG. 1, the clock signals H being given by the controlled pilot frequency or frequencies. However, the number of binary cells is appreciably higher.

In fact, in a particular embodiment case, the clock frequency has a value in the vicinity of 1.9 Mc/s, and the number of binary elements constituting the pseudo-random sequence, which number is here denoted by r, is equal to 127.

Figure 8:
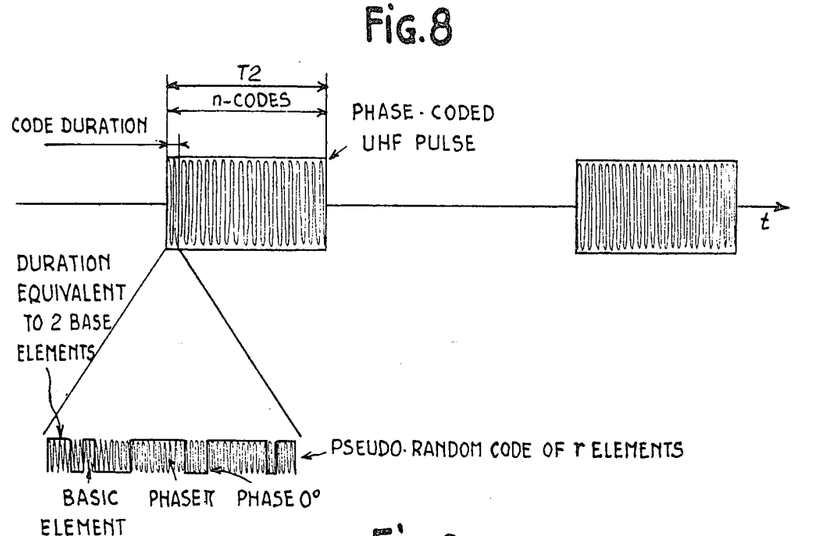
FIG. 8 is a time diagram illustrating coding by phase inversion according to the invention of a pseudo-random sequence on a carrier wave for one of the segments of the form illustrated in FIG. 5.

For a better understanding of the reception, it is necessary to know the transmission characteristics illustrated diagrammatically in FIG. 8. During its transmission segment (FIG. 5), the interrogator 30 transmits a "U.H.F. pulse", coded according to a known pseudo-random sequence. The U.H.F. pulse (or U.H.F. wave train) comprises the repetition of n adjacent identical codes, and each code comprises, as is illustrated in detail in FIG. 8, a pseudo-random sequence modulating the carrier wave by phase inversion. It will be noted that, differing from the modulation by phase inversion of FIG. 3, the modulation by phase inversion of FIG. 8 comprises a large number of alternations of the carrier wave in each binary element of the pseudo-random sequence.

In one version, the length $T_2$ of the U.H.F. pulse is 2.5 milliseconds, the transmission power being 5 watts. The number n of codes is then approximately 37 in each U.H.F. pulse. The carrier frequency is, for example, between 420 and 450 Mc/s.

Considering the transmission frequency spectrum of FIG. 8, spectrum characteristics will be observed which are very close to those of the repetition of an unmodulated pulse of a duration equal to the duration T of the basic binary element of the pseudo-random sequence (about 0.5 microsecond). This spectrum has a width of 2 Mc/s at 3 dB and 7 Mc/s at 20 dB approximately.

Figure 10:
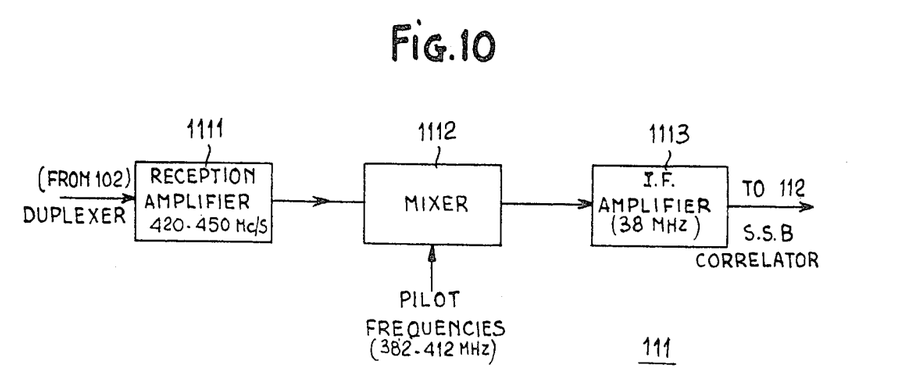
FIG. 10 illustrates in a more detailed manner the circuit of the reception and the heterodyne amplification stages of the responder of FIG. 6.

Reverting now to FIG. 6, the output of the duplexer 102 is connected to a reception and heterodyne amplification unit 111 shown in detail in FIG. 10.

This unit comprises first of all a reception amplifier stage properly so-called, tuned to receive a carrier wave of between 420 and 450 Mc/s. In FIG. 10, this reception amplifier 1111 is followed by a mixer 1112 receiving in controlled fashion a heterodyne frequency selected from a discrete sequence of frequencies between 382 and 412 Mc/s from the pilot source 103. The heterodyne frequency is so controlled that the output frequency of the mixer is 38 Mc/s for the carrier frequency concerned; it is known that this heterodyne frequency control thus defines the choice of the carrier frequency actually received. The mixer 1112 is followed by an intermediate frequency amplifier 1113, tuned to 38 Mc/s, but with a relatively wide band, since it has just been seen that the width of the spectrum is 7 Mc/s at 20 dB.

The output of the intermediate frequency amplifier 1113, which is also that of the reception stage 111 of FIG. 6, is applied to a circuit 112 which is a single side band correlator with amplification.

The S.S.B. correlator 112 is followed by a frequency control command 113 which acts directly on the controlled frequency of the source 103, this controlled frequency being that which gives rise to the local pseudo-random sequence produced by the circuit 105 and applied particularly to the S.S.B. correlator 112.

This S.S.B. correlator 112 and the frequency control command 113 will be described in more detail with reference to FIG. 11.

For the moment, it will be borne in mind simply that the correlator 112 carries out a correlation between the pseudo-random sequence arriving at it from the output of stage 111, or received sequence and the local pseudo-random sequence produced by the circuit 105.

A priori, these two pseudo-random sequences are not synchronous; their correlation will therefore give a zero result as will be seen later. The frequency control command 113 will therefore act on the control frequency involved in circuit 105 until the correlator 112 supplies a correlation peak, indicating that the local pseudo-random sequence 105 in synchronous with the received pseudo-random sequence to within the duration of half a binary element.

The local pseudo-random sequence of circuit 105 is, in its turn, applied to a phase inversion modulator 121, which receives as signal to be modulated one of the pilot frequencies of the source 103. This modulator applies to the power amplifier 122 a carrier frequency modulated by phase inversion in a manner identical with that which is received. During the transmission segment assigned to the responder 10, the time shaping circuit 104 applies a transmission command to the power amplifier 122.

Figure 9:
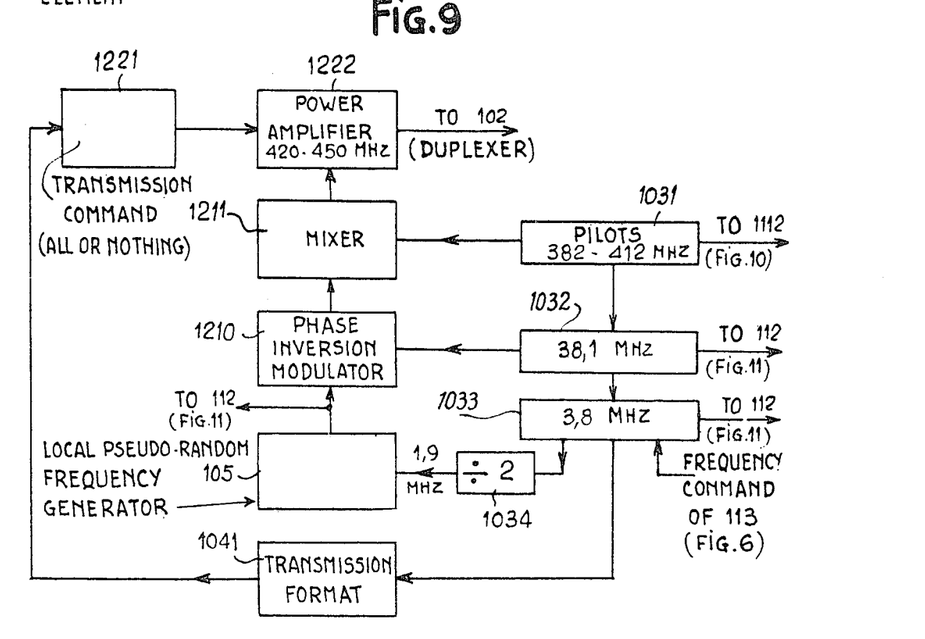
FIG. 9 illustrates in a more detailed manner the transmission part of the responder of FIG. 6 for obtaining transmitted signals of the type illustrated in FIG. 8.

That is why, referring to FIG. 9, a power amplifier 1222, properly so-called, is controlled all or nothing by the transmission control circuit 1221, which in turn responds to the transmission shaping circuit 1041.

In FIG. 9, the pilot frequency source 103 is subdivided into a pilot frequency source 1031, properly so-called, and different circuits 1032 to 1034 supplying by frequency synthesis or division other frequencies of lower values.

In circuit 1031, a plurality of thermostated quartz pilots supply frequencies forming a discrete sequence from 382 to 412 Mc/s. In a modification, the circuits 1032 to 1034 also comprise independent thermostated quartzes.

In controlled manner, according to the value of the selected carrier frequency, one of the pilot frequencies is sent to the mixer 1112 already mentioned (FIG. 10); a frequency is also sent to the mixer 1211 of FIG. 9. In this same figure, a circuit 1032 supplies from the pilot frequencies a frequency of 38.1 Mc/s which is applied, on the one hand, to a phase inversion modulator, properly so-called, as signal to be modulated, and on the other hand to single side band demodulators 11211 and 11221 forming part of the S.S.B. correlator 112 and which will be described later in connection with FIG. 11.

A circuit 1033 then produces a frequency of 3.8 Mc/s, this frequency being controlled in response to the control command 113 of FIG. 6. For this purpose, the circuit 1033 may comprise for example a controlled relaxation oscillator and a frequency controlled oscillator, for example of the type VCO (frequency control by a voltage).

This frequency of 3.8 Mc/s of the circuit 1033 is applied first of all by means of a frequency halver 1034 to the local pseudo-random sequence generator 105. It will be seen that the clock frequency applied to this generator is therefore 1.9 Mc/s, which corresponds well, for the basic binary element of the pseudo-random sequence, to a duration of approximately 0.5 microsecond.

The frequency of 3.8 Mc/s of the circuit 1033 is also applied to the transmission shaping circuit 1041 as well as to reception shaping circuit (not shown in detail in FIG. 9).

Finally, this frequency of 3.8 Mc/s is sent to a shift measurement phase inverter forming part of the single side band correlator 112, in its embodiment described with reference to FIG. 11.

Thus, in FIG. 9, the pseudo-random sequence generated in FIG. 5 modulates by phase inversion a signal having a frequency about twenty times higher (38.1 Mc/s applied to the modulator 1210). A frequency change (mixer 1211) then permits the transmission to pass to the carrier frequency. The person versed in the art will understand that the frequency change, whether by reduction or increase in the frequency, will not alter the phase invention modulation. The number of alternations modulated according to each binary element of the pseudo-random sequence simply becomes smaller or greater, respectively.

Considering now FIGS. 6, 9 and 10 as a whole, it appears that the responder 10 will receive a coded pseudo-random sequence, will synchronise its local pseudo-random sequence (generated by circuit 105) with this received pseudo-random sequence and then retransmit in the same way this local pseudo-rando sequence.

Here and now it will be seen that the difficulty resides in obtaining extremely precise synchronism between the local pseudo-random sequence and the received pseudo-random sequence. This is done by means of circuits 112 and 113 of FIG. 6, in which a particular, more detailed embodiment will now be described with reference to FIG. 11.

Figure 11:
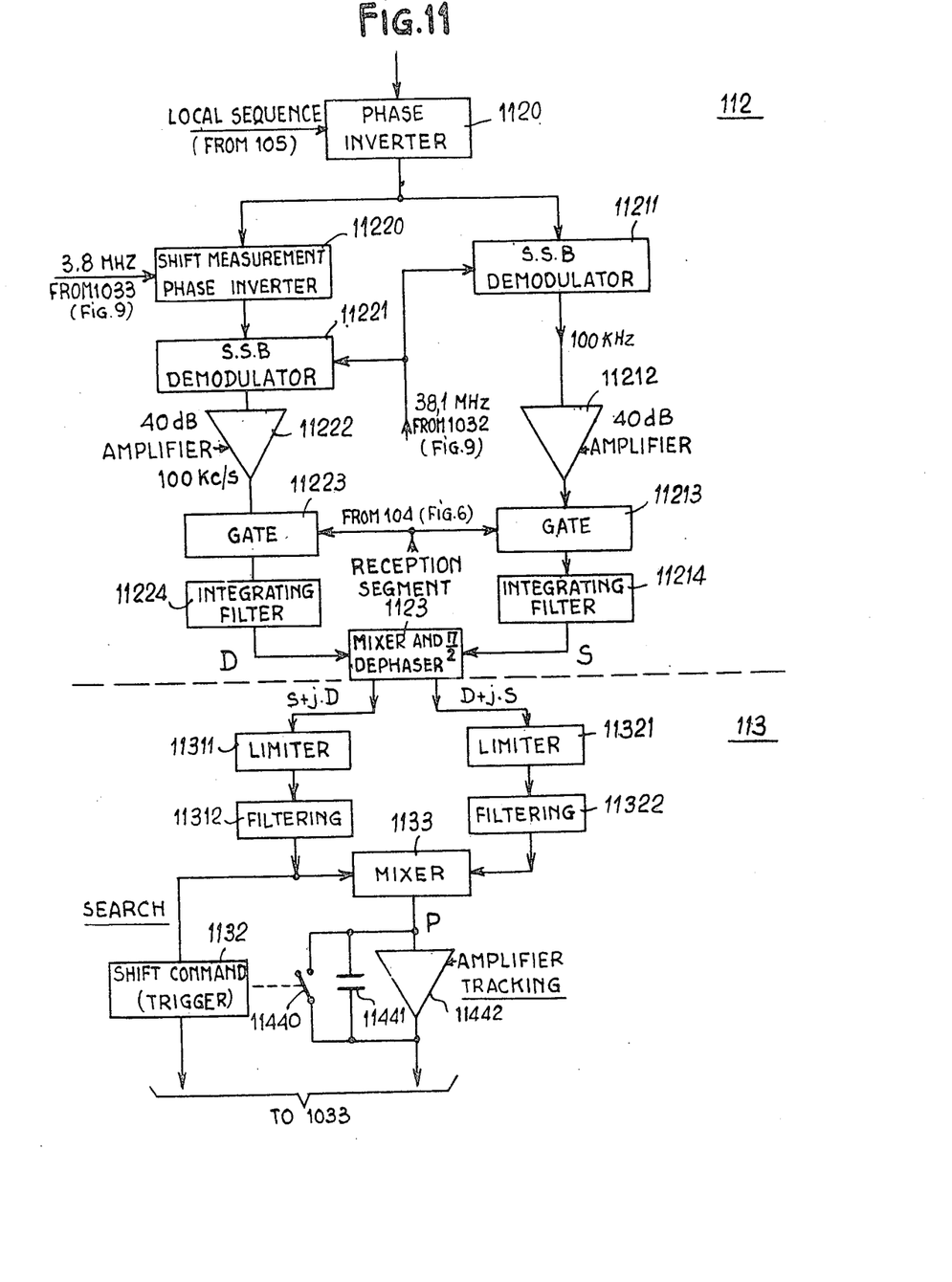
FIG. 11 illustrates in detailed manner the circuit of a demodulation channel of the responder of FIG. 6.

This FIG. 11 comprises a single side band correlator part 112 and a control command part 113, separated by a line of long dashes. Actually, this separation is some- Assuming first of all that this is not the case, the route S+j.D is applied across the circuits 11311 and 11312 to a phase-difference control or trigger circuit 1132. This circuit will act on the circuit 1033 of FIG. 9 for adding (or suppressing) a pulse to (or from) the clock signal applied to the circuit 103. Due to this, the local pseudo-random sequence will be progressively shifted by one binary element.

With the filtering characteristics indicated, the local sequence will thus be shifted progressively only every second to be sure that there is no correlation.

Since the sequence comprises 127 binary elements, 126 shifts will be necessary in the most unfavourable case. The time of acquiring a correlation is therefore at the most equal to 127 seconds.

Of course, as soon as synchronisation is obtained at about $\pm T_1/2$, progressive shifting of the local pseudo-random sequence is no longer carried out, and the switch 11440 of FIG. 11 is then open.

At this moment the "tracking" stage commences. For this, another mixer 1133 mixes the signal S+j.D with the signal D+j.S by changing over one for the other and supplying a phase-shift measuring signal P.

This signal P is applied to an amplifier 11442 connected as integrator by means of a capacitor 11441; this integrator has just been released by opening of the switch 11440.

The output of amplifier 11442 acts on the circuit 1033 of FIG. 9 for modifying continuously the frequency of 3.8 Mc/s to obtain extremely precise synchronism of the local sequence with the received sequences.

It will be noted that it would have been possible to obtain directly the product S.D. in amplitude by means of the outputs of the integrating filters 11214 and 11224. However, by using according to the invention the sums S+j.D and D+j.S (mixer 1123) by limiting them in aplitude (11311 and 11321) and by filtering them separately (11312 and 11322), then by mixing them again (1133), a "phase-shift measurement" is performed, in which the control gain is practically independent of the signal-to-noise ratio obtained on reception. According to this technique, the magnitude of the control error is formed by a phase shift instead of being formed by an amplitude as would be the case if the product S.D. were obtained directly.

Recalling what has been said earlier with regard to the filters 11214 and 11224, their output signal has a phase which is given by integrating filtration of the phase jumps observed at the output of the S.S.B. demodulators (11211 and 11221, respectively). It is therefore possible to consider that an action on the amplitude is involved as well as an action on the phase.

The devices of the invention are placed in this second category by utilising a quadrature vector combination of the signals S and D.

More exactly, in response to the output of the circuit 1132, a relaxation oscillator is actuated for supplying additional clock pulses to the sequence generator 105 (if this relaxation oscillator is included in circuit 1033, it should supply pairs of pulses owing to the frequency division by two of the counter 1034). Direct action on the sequence generator 105 could also be provided.

With regard to the action of the output of the integrating amplifier 11442, this is the action of a d.c. voltage on an oscillator controlled by a voltage. Numerous methods are known for arranging the circuit 1033 as a voltage-controlled oscillator (VCO or VCXO).

The Applicants have obtained remarkable performances by means of the S.S.B. correlation system with phase-shift measurement described in connection with FIG. 11. In fact, according to the speed of electromagnetic waves, the duration of the basic binary element of a pseudo-random sequence, which is 0.5 microsecond, corresponds to a propagation distance of 75 meters, taking the outward-and-return path into account.

Actually, however, the frequency control system with phase-shift measurement makes it possible, with satisfactory signal-to-noise ratio, to obtain a distance measurement definition better than 1 meter. It is therefore clear that the definition obtained for time fixing of the local sequence with respect to the received sequence is at least of the order of one hundredth of the duration of the basic element, always taking into account the outward-and-return path.

Of course, for this purpose, the controlled phase inverters must comprise extremely rapid switching circuits.

Preferably, filters 11214 and 11224 of FIG. 11 comprise two alternately switchable past bands. The wider band is used during coincidence search and the narrower one during coincidence tracking.

Of course, the cut-off frequency fc of the control loop is selected to be definitely less than the inverse of double the repetition period of the UHF pulse, as defined by the shape of FIG. 5.

Consequently, the frequency control will accumulate the information existing during the time 1/fc, which is very long, thereby improving the signal-to-noise ratio and hence the precision.

The responder of FIG. 6 has now been described completely. It is now necessary to describe the interrogator illustrated in FIG. 7, taking into account the fact that numerous elements of this interrogator are similar to elements of the responder.

Figure 7:
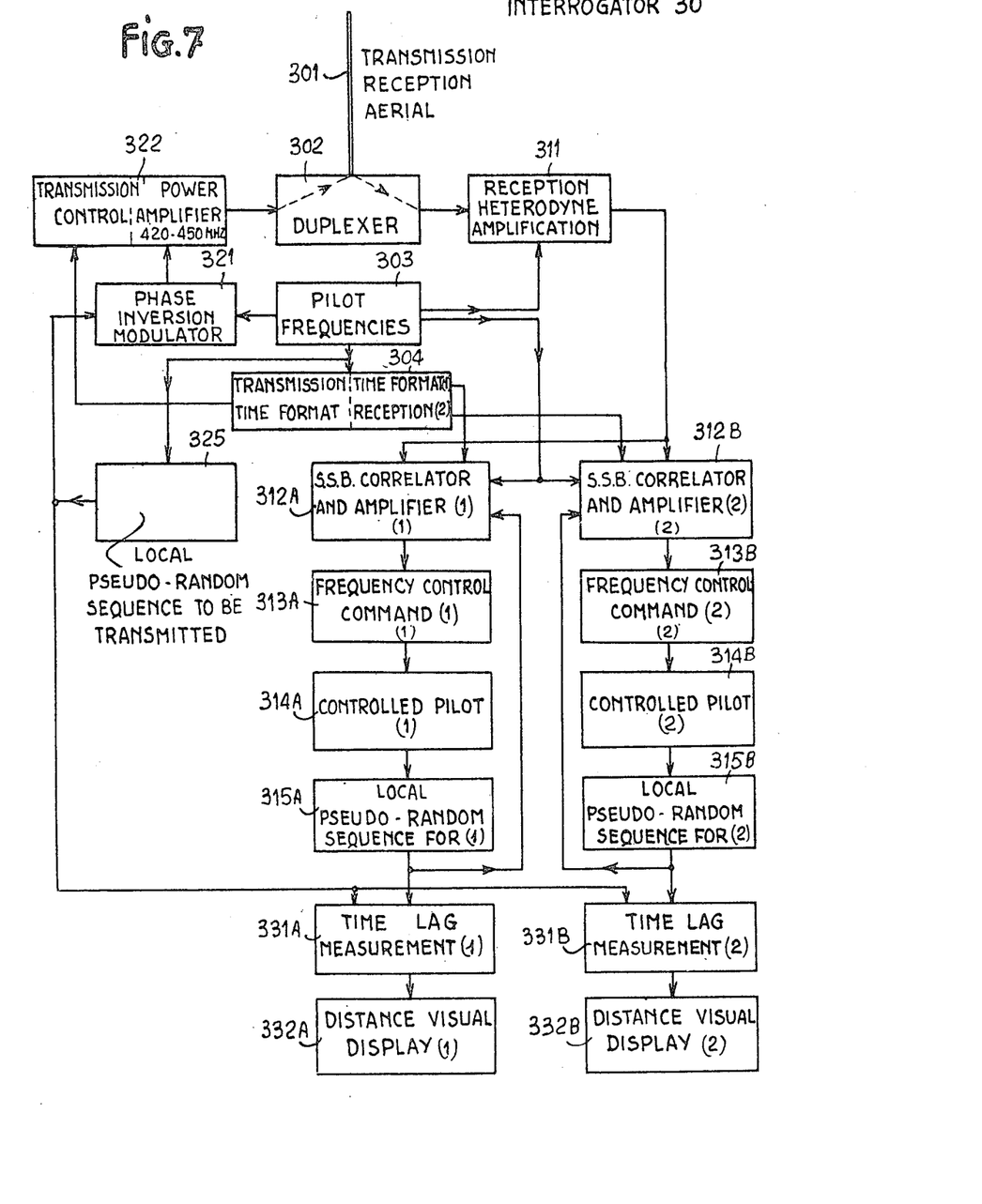
FIG. 7 illustrates the basic block diagram of the mobile interrogator of FIG. 4.

In FIG. 7, the interrogator 30 comprises an aerial 301, followed by a duplexer 302.

The interrogator 30 also comprises a source 303 of pilot frequencies, as well as a shape control circuit 304 fed by one or more frequencies.

The shaping circuit 304 is adapted to produce firstly a transmission time segment, then two reception time segments, one corresponding to the responder (1) and the other to the responder (2). The time distribution of the segments is that of FIG. 5.

In its transmission part, the interrogator 30 comprises a phase inversion modulator 321, a transmission command power amplifier 322, and a generator of local pseudo-random sequence to be transmitted 325, receiving as clock a frequency from the pilot frequency source 303.

The structure of these circuits and their operation may be the same as those of the corresponding circuits 121, 122 and 105 of the responder of FIG. 6.

However, the generator 325 of local pseudo-random frequency to be transmitted produces the initial sequence of the system serving as point of departure. For that reason, the pilot frequency source 303 and consequently the sequence generator 325 are not the object of any external action.

In the reception part of the interrogator 30 of FIG. 7, there is first of all a reception and heterodyne amplification stage 311. The amplifier is common, whether the waves received come from the responder (1) or responder (2).

what arbitrary, since the demodulation in circuit 112, which is two-way in FIG. 11, depends upon the type of control desired for circuit 113.

The single side band correlator comprises first of all a phase inverter 1120 commanded by the local sequence from circuit 105 of FIG. 6. This phase inverter is the actual correlator, since if the local pseudo-random sequence is synchronous with the pseudo-random sequence received, the output of the phase inverter will be a sinusoidal signal not comprising any phase inversion. In the contrary case, the output of the phase inverter 1120 will comprise phase inversions distributed in a practically random manner according to the property of these sequences justifying the appellation "pseudo-random".

Figure 12:
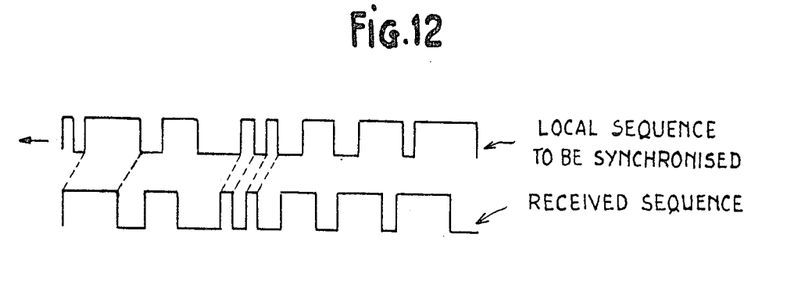
FIG. 12 is time diagram showing a lag between a local pseudo-random sequence and a received sequence.

To specify this, reference will be made to FIG. 12 representing a slight shift between the local sequence to be synchronised and the received sequence, and FIG. 13A which represents the correlation function of these two sequences according to their divergence in number of basic binary elements.

Figure 13A:
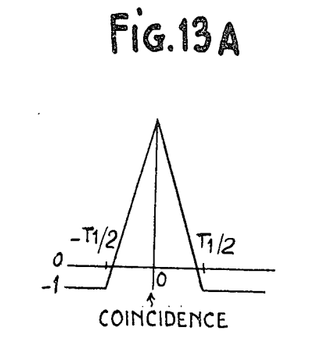
FIGS. 13A and 13B are two time diagrams permitting the operation of the circuits of FIG. 11 to be better understood.

If $T_1$ is the duration of the basic binary element, it will be seen in FIG. 13A that the correlation function admits of a peak between local sequence and received sequence between $-T_1/2$ and $T_1/2$. The maximum of the peak corresponding to perfect coincidence of the two pseudo-random sequences has a value which increases with the number r of binary elements contained in the pseudo-random sequence.

Reverting now to FIG. 11, the phase inverter output 1120 is applied to an S.S.B. demodulator 1032 which receives a frequency of 38.1 Mc/s from circuit 1032 of FIG. 9.

Such an S.S.B. demodulator is known in principle and is currently used in radio-electric transmission techniques of the same name.

The output of the phase inverter or correlator 1120 is a 38 Mc/s signal with or without phase inversions, according to whether synchronism is effected at about $\pm T_1/2$ or not; the S.S.B. demodulator in fact produces a frequency change for passing to a frequency of 100 kc/s, (38.1 Mc/s less 38 Mc/s).

Recalling that the duration of the basic binary element of the sequences corresponds to a frequency of 1.9 Mc/s, it is quite clear that a demodulation is involved here, because the signal obtained has a frequency of 100 kc/s, definitely less than 1.9 Mc/s.

The phase inversions, distributed randomly in the case of non-coincidence, will be translated by phase jumps on the 100 kc/s signal.

The effect of these random phase jumps is to reduce the mean amplitude of the 100 kc/s signal if integrating filtration is carried out with a fairly narrow pass-band, as described later.

The pass-band of the integrating filter makes it possible to get rid at least partly of the Doppler effect due to the movement of the mobile object.

However, we have seen in the foregoing that the phase modulation spectrum is very wide (7 Mc/s at 20 dB). Under these conditions the frequency change to obtain 100 kc/s would be accompanied by folding of the spectrum if the change was carried out normally. For that reason, frequency changing is carried out with a single side band by means of a single side band demodulator.

This S.S.B. demodulator 11211 is followed by a high-gain (40 dB) amplifier 11212.

The latter is itself followed by a gate circuit 11213, controlled by the reception segment from the shaping circuit 104 of FIG. 6. This gate is itself followed by an integrating filter 11214 (mentioned above).

In a second channel, the output of the phase inverter 1120 is also connected to a shift measurement phase inverter 11220, which receives a frequency of 3.8 Mc/s from the circuit 1033 of FIG. 9. This phase inverter subdivides the basic binary elements according to the local sequence into two equal parts, one of which has a positive polarity and the other a negative polarity, since the frequency of 3.8 Mc/s is equal to double the frequency of 1.9 Mc/s defining the duration of the basic binary element.

This phase inverter 11220 is followed by circuits 11221 to 11224.

The output of the integrating filter 11214 supplies a signal which represents the correlation, i.e. the integral (or sum) over at least one period of the instantaneous product of the local sequence multiplied by the received sequence. This signal alone would suffice for controlling the shift of the local sequence until synchronism at about $\pm T_1/2$ was obtained. For this reason this signal is denoted by S.

Figure 13B:
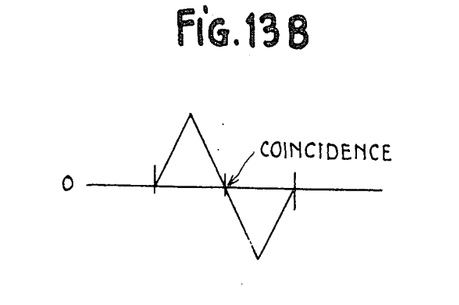

On the contrary, the output of the integrating filter 11224 is an integral of the same kind but in which each binary element is divided into two parts, one having the + sign and the other the − sign. This is then a differential signal which is denoted by D and which will be cancelled out in a stable manner when the local sequence is strictly synchronous with the received frequency (FIG. 13B).

The filters 11214 and 11224 have a pass band of the order of a hundred c/s, whereby it is possible partly to eliminate the Doppler effect due to the speed of the mobile object.

Furthermore, it should be noted that the S.S.B. demodulation gives the product of two similar spectra, one local and the other received with elimination of one of the side bands obtained by the multiplication operation; the result is an attenuation of 3 dB in the noise and in various jammings with respect to the useful signal.

Reverting now to FIG. 11, the signals S and D are applied to a circuit 1123 which is a mixer and 90° dephaser. This mixer 1123 supplies on the one hand a signal S+j.D, and on the other hand a signal D+j.S. In these output signals, the symbol j is used to denote the unit vector of an imaginary axis ($j^2 \pm 1$) in the Fresnel notation. The sign j therefore represents a phase difference of 90°. For this, if it is recalled that the frequency of the signals S and D is of the order of 100 kc/s, it is sufficient to use the phase difference given by two R-S cells, one having a capacitor at the head and the other a resistor at the head, those two cells having a cut-off frequency equal to 100 kc/s. The two cells then each give a phase difference of 45° but with opposite signs. The sum of these two phase differences therefore gives 90°. After having thus subjected the S signal and D signal to a phase displacement of 90°, it is merely necessary to make a simple analogue addition to obtain the said output signals D+j.S. and S+j.D.

The two channels thus obtained are each subjected to amplitude limitation and to re-filtering (circuits 11311, 11312 and 11321, 11322, respectively).

It is then necessary to distinguish whether synchronism between local sequence and received sequence has been obtained at about $\pm T_1/2$ or not ("shaping and coincidence search").

Reception is then effected by two separate channels, depending on whether the responder (1) or the responder (2) is concerned, in a manner controlled by the time shaped reception signals coming from circuit 304.

The first channel comprises an S.S.B. correlator and amplifier 312A controlled by the shaped signal (1); this stage is followed by a frequency control command circuit 313A, acting on a generator 314A of controlled pilot frequency. Finally, a generator 315A of local pseudo-random sequence associated with the responder (1) receives as clock a frequency from the pilot frequency generator 314A.

It is the local pseudo-random sequence thus generated which is returned to the S.S.B. correlator 312A to be subjected to correlation with the signal received during the transmission segment of the responder (1). In this way, it will be possible to bring the local pseudo-random sequence of circuit 315A into coincidence with the pseudo-random sequence from the responder (1), as received.

The other reception channel route comprises exactly the same elements, the numerical reference ending in the letter B.

In FIG. 7, the element 311 is similar in structure and function to those of element 111 of the responder of FIG. 6, detailed in FIG. 10.

The elements 312A and 313A on the one hand, and 312B and 313B on the other hand are also similar in structure and function to those of the elements 112 and 113 of FIG. 6, detailed in FIG. 11.

The generators of controlled pilots 314A and 314B are identical in operation and may have the same structure as the controlled frequency 1033 of the source 103 of FIG. 6, detailed in connection with FIG. 9.

More precisely, this is a thermostated oscillator at the frequency of 3805,372 kc/s accompanied by a relaxation oscillator, permitting repetitive shift of a binary element in the following sequence generator, as described in the foregoing.

Referring again to FIG. 11, it will be seen that the control command 313A of FIG. 7 will have two outputs, one acting on the relaxation oscillator for shifting by a binary element each time the pseudo-random sequence generated in 315A, and the other (integrating amplifier 11442) acting on a fine frequency command of the thermostated oscillator (of the type VCO or VCXO, for example).

Before considering the last circuits of the interrogator 30 there will now be described the general functioning of the system with reference to FIGS. 4, 5, 6 and 7.

The operations commence with the transmission segment of the interrogator 30 (FIG. 5), which will transmit the pseudo-random sequence of the circuit 325 (FIG. 7).

During this time, the two responders (1) and (2) (having respectively the references 10 and 20) will receive this UHF signal and tend to cause their local pseudo-random sequence (circuit 105 of FIG. 6) to coincide with the original sequence coming from the interrogator 30, but as received at the level of each of the responders 10 and 20. Consequently, the local sequence of the responder 10 will have, with respect to the initial sequence of the interrogator 30, a delay equal to the time of propagation of the carrier wave from the interrogator 30 to the responder 10; this delay represents the distance from the interrogator to the responder 10, since the speed of propagation of the wave is assumed to be known.

Similarly, the local sequence of the responder 20 will comprise, with respect to the initial sequence of the interrogator 30 a delay representing the distance separating the interrogator 30 from the responder 20.

The pseudo-random sequence generators, which are thus keyed together in time, will retain this keying.

In its turn, the responder 10 will retransmit its pseudo-random sequence with a shift of its own equal to an exact multiple of the period of this sequence in the reception channel of interrogator 30 (FIG. 7). The local pseudo-random sequence of the generator 315A of FIG. 7 is therefore shifted in time with respect to the initial random sequence of the circuit 325; this time shift represents twice the distance from the interrogator 30 to the responder 10 added to which is its own shift equal to an exact multiple of the period of this sequence.

When it is the responder 20 which retransmits, the local sequence generator 315B of FIG. 7 will be progressively brought into coincidence with the sequence from the responder 20 as received at the interrogator 30. Finally, the time shift between the sequence of the generator 315B and the initial sequence of the generator 325 also represents twice the distance from the interrogator 30 to the responder 20. The pseudo-random sequence generators are generally connected up to supply a pulse at the end of the sequence, that is to say, in the example of FIG. 2, a pulse at the moment of passage from the 7th to the 8th clock time. To obtain this end of sequence pulse, it is possible to use a counter receiving the same clock pulses as the shift register serving as sequence generator properly so-called, including the above-mentioned shift pulses.

Figure 14:
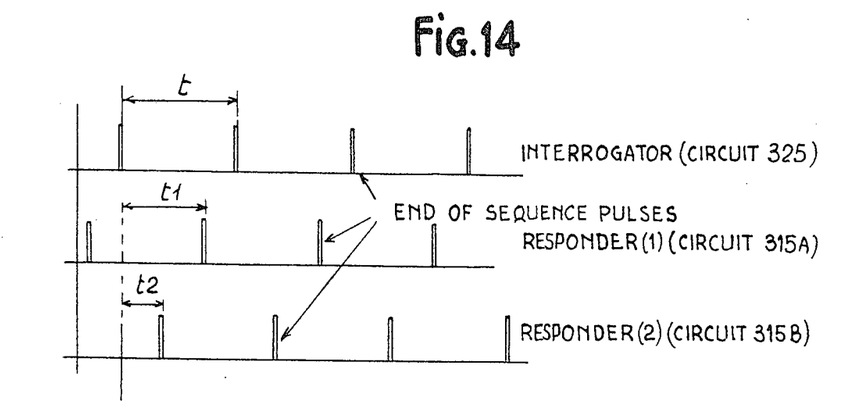
FIG. 14 is a time diagram illustrating the degree of time lag in the interrogator of FIG. 7, and FIGS. 15 and 16 illustrate a determination of position according to the invention of redundant circular type and hyperbolic type, respectively.

In FIG. 14, these pulses are shown on the one hand for the initial sequence of the interrogator, and on the other hand for the sequences which have undergone a passage to and from the responder (1) and the responder (2).

Returning now to FIG. 7, circuits 331A and 331B measure respectively the time shifts between the initial sequence of the interrogator 30 and each of the two sequences making the forward and return passage to and from the responder (1) and the responder (2).

For this measurement of the time shift, counting is used which subdivides the time in a manner proportional to the speed of propagation of the electromagnetic wave, taking into account the factor 2 due to the forward and return passage, so as to obtain directly the distances in numerical form. The two distances are then visibly displayed in the elements 332A and 332B.

There has just been described a first embodiment of the invention involving two responders and one mobile interrogator. This relates to a position determination of circular type, since the distance from the interrogator to each of the responders is obtained directly. This mode of operation is termed saturable because the number of mobile interrogators capable of operating with two given fixed responders is limited, particularly because of the limited time shape of the transmission.

Actually, the invention is applied in a much more general manner: For position determination, it is necessary to know how to produce in a first place a first time base, and in a second place a second time base, connected to the first by means of an electromagnetic transmission, which consequently involves the time of propagation of the magnetic wave, the speed of which is assumd to be known.

For that reason, it is possible to consider the device in a somewhat more general manner in the scope of an aid process to the measurement of distances of the transmission type between at least one transmitter and at least one receiver of pulsed information defining an instant, carried by an electromagnetic wave and comprising the following operations:

At the transmitter:
  generating a clock signal,
  producing from the clock signal a repetition of a pseudo-random sequence,
  producing from the clock signal and from the known pseudo-random sequence, a high-frequency signal modulated by phase inversion according to the known pseudo-random frequency,
  radiating a UHF wave train comprising part of the UHF signal constituted by a predetermined number of repetitions of the pseudo-random sequence,
at the receiver;
  generating a clock signal,
  producing in adjustable fashion from the clock signal a local repetition of a pseudo-random sequence,
  this local repetition being shifted until it coincides with the first repetition, modulating the wave train as received, whereby it is possible to connect the propagation time of the electromagnetic wave from the transmitter to the receiver and thereby the distance from the transmitter to the receiver.

More precisely, instead of transmitting a short high-power pulse, the repeated transmission of the same pseudo-random sequence having a duration of basic binary element equal to $T_1$ (0.5 microsecond) is spread over the period of time $T_2$ (2.5 milliseconds). Thus, by the transmission of a peak power of 5 watts for 2.5 milliseconds, it is possible with the correlation and control techniques used, to obtain results equivalent to those which would be possible with the transmission of an unmodulated pulse during 0.5 microsecond at the power of 25 kW.

In another particular case of embodiment of the invention, the ratio $T_2/T_1$ is in the vicinity of 10,000, the duration of transmission is 50 milliseconds, and the peak power is 500 watts, which is compatible with the production of the transmitter in transistorised form. The results then obtained are equivalent to those which would be permitted by the transmission of an unmodulated pulse for 5 microseconds at a peak power of 5 megawatts.

Furthermore, the transmission period $T_2$ used here comprises a repetition of the same pseudo-random sequence. This reptition involves n times in succession a pseudo-random sequence having r binary elements (r=127 for example), each having a duration of 0.5 microseconds.

The choice of the numbers n and r should be made by taking into account two consequences:
  the greater n is, the greater is the ambiguity in the time shift measurement; in FIG. 14, it is clear that the time shift measurement is obtained with a whole multiple of times except for the duration of one sequence; it would be of interest, therefore, to lengthen the sequence by increasing r, for diminishing n and with it the ambiguity;
  the greater r is, the longer is the time to acquire coincidence, as described in the foregoing; in fact, it is necessary to remain for a certain time on each fixing of the local sequence during the search stage, and the number of shifts necessary may go to 126.

In the first embodiment explained in the foregoing, it has been seen that the period during which each keying of the local sequence is correlated is 1 second, which obviously causes a large number of consecutive wave trains to be involved, since the duration of each transmission is 2.5 microseconds.

In the most unfavourable case, the time to reach coincidence would then be substantially equal to 127 seconds.

In this first embodiment, the method which has just been recalled above is used first of all once between the interrogator and the two responders simultaneously, then another time on return from one of the responders to the interrogator, and a third time on return from the other responder to the interrogator (FIG. 5).

Under these conditions, it is clear that as well as at the level of the interrogator and at that of each of the responders, each generator of pseudo-random sequence has to supply an uninterrupted repetitive chain of its sequence for keeping in store the time information carried by this sequence.

On the contrary, this time information is only transmitted from time to time, for example according to the shape of FIG. 5, between the interrogators and responders and vice versa. The stability of the generators of the pseudo-random sequence and consequently that of the oscillators producing their clock frequency, is therefore equally an essential factor. That is why they are thermally stabilised (thermostated pilots).

There is also seen to appear here the other problems well known to persons versed in the art of position determination, and in particular that of the compromise between the overall periodicity of the transmission shape and the stability of the oscillators. In this respect, an explanation has already been given in connection with FIG. 11 as to how the reception channels formed the subject of a compensation regarding the Doppler effect due to the movement of the interrogator.

Figure 15:
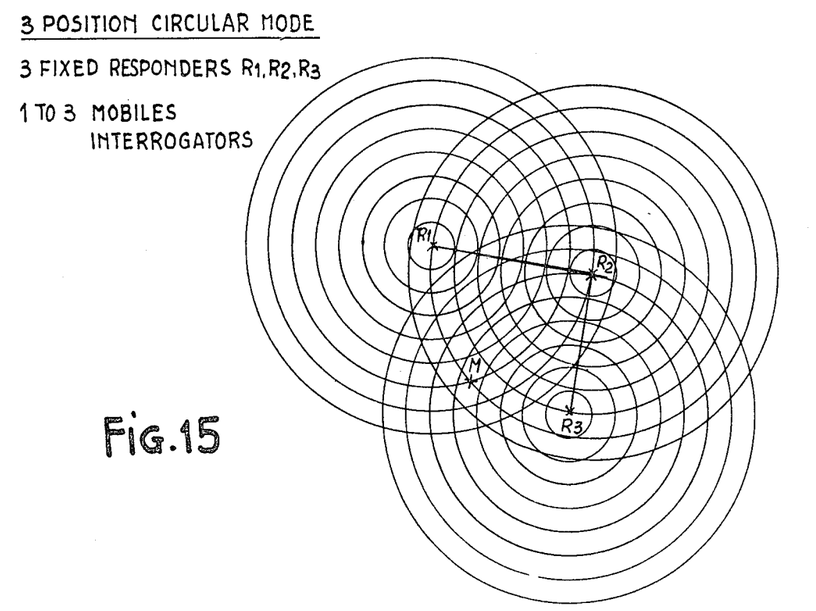

FIG. 15 illustrates very diagrammatically a position determination of the saturatable circular type defined hereinbefore, but with three responders. The third responder is identical with the other two, and it is merely necessary to provide a third transmission segment of the responder in the shape shown in FIG. 5. The duration of this segment is also an exact multiple of the period of the local pseudo-random sequence of this third responder, and it is such that the transmissions of the responders and of the interrogator do not overlap.

Figure 16:
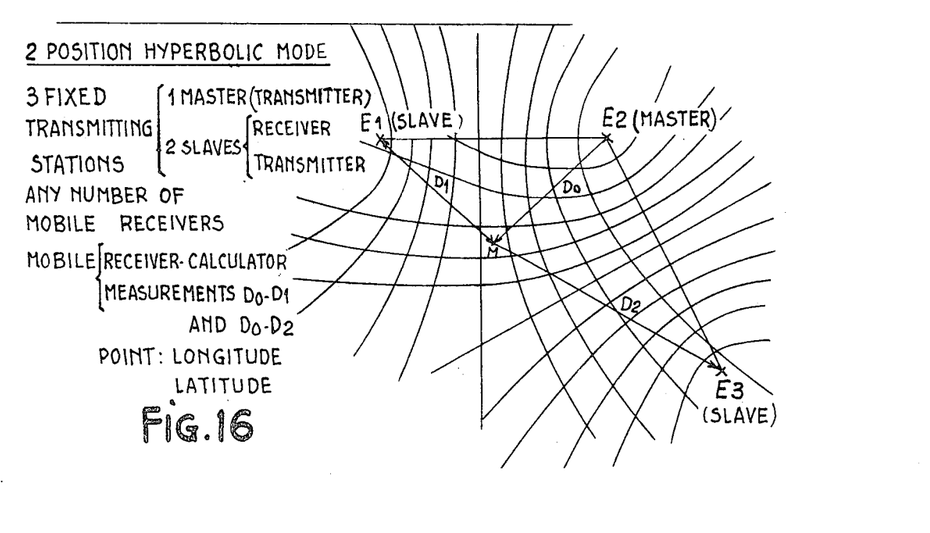

FIG. 16 shows a second embodiment of the invention, A fixed station $E_2$ serves as "master" and comprises only the transmission part of FIG. 7 (circuit 321, 322 and 325), with of course the pilot frequency source 303 and the transmission part of the time shaping circuit 304.

Two slave stations $E_1$ and $E_2$ are provided; they may be constituted exactly like the responders of the first embodiment. The local pseudo-random sequences of these two slave transmitters are brought into coincidence on the sequence suitable to them of the "master" transmitter $E_2$, as received. This is translated by a fixed time shift, therefore known, which for example may be compensated.

Under these conditions the mobile object M simply comprises one three-channel receiver, similar to the reception part of the interrogator 30 of FIG. 7. It is necessary, of course, to include therein a third channel as well as a pilot frequency source 303 and a three-segment reception part, corresponding to the shaping circuit 304.

The local pseudo-random sequences of the three channels are brought respectively into coincidence with the sequences from each of the three transmitting stations, as received.

Unlike what occurred in the interrogator of FIG. 7, the time shifts are measured between these three local sequences, which supplies the distance differences and consequently the hyperbolic position lines.

In FIG. 16, two hyperbolic networks have been established by taking the time shifts of local sequences associated with the station $E_1$ and the station $E_2$, on the one hand, and station $E_2$ and station $E_3$ on the other hand.

Of course, starting from the general process given above, other embodiments may be provided; for example, with one "master" transmitting station and three "slave" transmitting stations, two geographically separate hyperbolic networks are obtained. If two pairs of transmitting stations are used, each comprising a "master" transmitting station and a slave transmitting station linked to the said master station, two entirely independent hyperbolic networks are then obtained.

In these embodiments of hyperbolic type, the number of mobile users is unlimited.

The devices of the invention make it possible to envisage a precise distance measurement in the diffraction zone, that is to say beyond the radio-electric horizon, up to several hundreds of kilometeres.

As appears from the method very generally defined in the foregoing, the invention proposes a means of distance measurements and position determination capable of extremely numerous applications, for example:

High precision navigation for maritime craft (entry into port), terrestrial craft, aircraft (helicopters or aeroplanes);
hydrographic and geographical surveys;
sounding, dredging;
civil engineering work;
positioning of buoys, platforms, etc.;
fishing.

What we claim is:

1. A ranging method, comprising the following steps:
    at a first location;
        transmitting during a first time-period a first high frequency wave train comprising a carrier signal of predetermined frequency being phase-reversal modulated according to a first repetitive chain of a known pseudo-random sequence of binary elements,
    at a second location:
        receiving the first high-frequency wave train and correlating the first repetitive chain of the known pseudo-random sequence, said first chain of the sequence being modulated on said first wave train, with a local second repetitive chain of the same pseudo-random sequence, said second repetitive chain being shifted with respect to time so as to substantially coincide with the first repetitive chain received, and
        transmitting during a second time-period a second high frequency wave train comprising a carrier signal of the same predetermined frequency being phase-reversal modulated according to the second local repetitive chain of the pseudo-random squence thus shifted, said second time-period extending after and disjointed from said first time-period,
    at a third location:
        receiving the second high-frequency wave train and correlating the second repetitive chain of the known pseudo-random sequence, said second chain of the sequence being modulated on said second wave train, with a third local repetitive chain of the same pseudo-random sequence, said third repetitive chain being shifted with respect to time until it is caused to coincide with the second repetitive chain received, and
        sensing the time shift between the thus shifted third repetitive chain of the pseudo-random sequence and a fourth repetitive chain of the pseudo-random sequence, and sequentially repeating these steps with each of the first and second transmission time-periods of the first and second wave trains being disjointed.

2. A method according to claim 1, wherein the first and third locations are the same, said fourth repetitive chain of the pseudo-random sequence is the first repetitive chain of the pseudo-random sequence produced at the first location, and the sensed time-shift is representative of twice the distance from the first transmitter to the first receiver.

3. A method according to claim 1, further comprising the following steps at the third location:
    receiving the first high frequency wave train transmitted by the first transmitter and selectively correlating it with said fourth repetitive chain of the pseudo-random sequence, the fourth repetitive chain being time shifted until it is caused to coincide with the first repetitive chain received from the first transmitter, and
    the said sensed time shift between the third and fourth repetitions of the pseudo-random sequence being representative of the difference in the respective distances from the second receiver to the first transmitter and to the second transmitter.

4. A method according to claim 1, wherein each of the steps of receiving and correlating a said high frequency wave train comprises heterodyning the wave train, correlating the resulting heterodyned signal with the local repetitive chain of the pseudo-random sequence and single-side-band-demodulating the correlated signal to obtain a control signal for shifting the local repetitive chain of the known pseudo-random sequence.

5. A method according to claim 1, wherein each of the steps of receiving and correlating a said high frequency wave train comprises:
    receiving and heterodyning the wave train into a heterodyned signal;
    correlating the heterodyned signal with the local repetitive chain of the pseudo-random sequence to obtain a first correlated signal;
    phase reversing again the first correlated signal at a frequency being twice the frequency of the binary elements of the known pseudo-random sequence;
    separately single-side-band demodulating the first correlated signal and the phase reversed first correlated signal to obtain first and second control signals, respectively; and
    combining the first and second control signals for shifting the local repetitive chain of the pseudo-random sequence, said first control signal in the combination representing the correlation of the local and received repetitive chains of the pseudo-random sequence, and said second control signal in the combination being a fine indication of the time-shift between the local and received repetitive chains of the pseudo-random sequence.

6. A method according to claim 5, wherein said step of combination of the first and second control signals comprises separately phase shifting each signal by 90°, adding the first control signal to the 90° phase-shifted second control signal to form a first sum signal, adding the 90° phase-shifted first control signal to the second control signal to form a second sum signal, mixing in frequency said sum signals with each other and applying an integrating, low-pass filtration to the signal resulting from said mixing to obtain a tracking control signal, with the first sum signal being used to control bit by bit shifting by the local pseudo-random sequence generator while the tracking control signal is used to control modification of the bit frequency of the local pseudo-random sequence generator.

7. A method according to claim 1, wherein the time-periods of transmission of the wave trains and their period of repetition renewal correspond to respective whole numbers of periods of the pseudo-random sequence.

8. A method according to claim 1 wherein the time interval between said first and second time periods corresponds to a predetermined whole number of periods of the pseudo-random sequence.

9. A transmitting device comprising:
   a frequency source;
   a pseudo-random sequence generator coupled to the frequency source and having an output supplying a periodic repetition of a predetermined pseudo-random sequence of binary elements, with the repetition rate of the binary elements being related to the output frequency of the frequency source;
   a phase reversal modulator means coupled to the frequency source and to the pseudo-random sequence generator for phase-reversal modulating a frequency from the frequency source in accordance with the output of the pseudo-random sequence generator;
   an amplifier-transmitter means for transmitting when authorized by authorizing means a high frequency wave train from said phase-modulated signal; and
   means coupled to the frequency source for periodically authorizing said transmission for a timeperiod defined from said frequency source and equal to a first predetermined plural whole number of periods of the pseudo-random sequence,
   the period of said authoirzations being equal to a second number of periods of the pseudo-random sequence.

10. A receiving device for receiving a high frequency carrier wave which is phase reversal modulated in accordance with a periodic repetition of a known pseudo-random sequence comprising:
    a frequency source;
    a shiftable generator of pseudo-random sequence coupled to the frequency source and having an output supplying a local periodic repetition of said known pseudo-random sequence of binary elements, the repetition rate of which is related to the frequency of the said frequency source;
    means for the reception of the high frequency wave and for heterodyne amplification thereof into a high frequency signal supplied at an output; and
    correlator means having inputs coupled respectively to the output of said shiftable generator and to the output of said reception means for receiving and correlating said high frequency signal with the local periodic repetition of the pseudo-random sequence and providing an output signal;
    shift control means having an input coupled to the output of the correlator means and an output coupled to the shiftable pseudo-random sequence generator for controlling shift of the local pseudo-random sequence in dependence on said correlation means output until correlation is obtained, said correlator means comprising a correlating phase inverter having a signal input coupled to the output of said reception means, a phase inversion control input coupled to the output of said shiftable local pseudo-random sequence generator, and an output delivering a high frequency signal having a residual phase reversals which are related to the correlation between the periodic repetition of the known pseudo-random sequence received on said high frequency carrier wave and the local periodic repetition of the known pseudo-random sequence, a single-side-band demodulator coupled to the output of said phase inverter, and an integrating filter for filtering the output signal from said demodulator and supplying the resulting filtered output signal to said shift control means.

11. A receiving device for receiving a high frequency wave which is phase reversal modulated in accordance with a periodic repetition of a known pseudo-random sequence comprising:
    a controllable frequency source;
    a shiftable generator of pseudo-random sequence coupled to the fequency source and having an output supplying a local periodic repetition of said known pseudo-random sequence of binary elements, the repetition rate of which is related to the frequency of the said frequency source;
    said shiftable pseudo-random sequence generator being adapted to a step-by-step shifting action by suppression or addition of a binary element of the pseudo-random sequence, and the said frequency source being adapted to supply a controllable frequency to the shiftable pseudo-random sequence generator for varying the repetition rate of the said binary elements therein, the range of variation of said controllable frequency corresponding substantially to the shift obtained by suppression of a binary element in the pseudo-random sequence;
    means for the reception of the high frequency wave and for heterodyne amplification thereof into a high frequency signal;
    correlator means coupled to the said high frequency signal for correlating it with the local periodic repetition of the pseudo-random sequence;
    said correlator means comprising a first phase inverter controlled by the local pseudo-random sequence and two channels coupled to the output of said first phase inverter, said first channel comprising a first single-side-band demodulator for demodulating the signal from said first phase inverter and a first integrating filter receiving the demodulated signal from said first demodulator and supplying a signal S, and said second channel comprising a second phase inverter controlled by a frequency which is double the frequency of the binary elements supplied by the frequency source to the pseudo-random generator, said second phase inverter receiving the output signal from said first phase inverter, a second single-side-band demodulator for demodulating the signal from said second phase inverter, and a second integrating filter receiving the demodulated signal from said second demodulator and supplying a signal D;

shift control means coupled to said shiftable pseudo-random sequence generator and to the correlator means for controlling shift of the local pseudo-random sequence until correlation is obtained; said shift control means comprising:

phase shifting and summing means for supplying at a first line a signal S+j.D equal to the sum of the output of the first integrating filter and the output of the second integrating filter shifted in phase by 90°, and at a second line a signal D+j.S equal to the sum of the output of the first integrating filter shifted in phase by 90° and of the output of the second integrating filter;

means for separately limiting in amplitude and filtering in frequency the two signals S+j.D and D+j.S;

mixing means for adding together the two signals thus limited and filtered;

first control means responsive to said S+j.D signal for shifting step-by-step the pseudo-random sequence generator until said correlation is roughly obtained; and second control means for then finely shifting the pseudo-random sequence generator by frequency variation of said frequency source in response to the output of said mixing means.

12. A receiving device according to claim 11 wherein said second control means is connected to and is inhibited by the first control means as long as said correlation does not occur, said second control means acting to maintain at a substantially zero value the output of said mixing means when said correlation does occur.

13. A transponder, for use in a ranging system using high frequency wave trains of predetermined carrier frequency being transmitted during repetitive first time periods and being phase reversal modulated in accordance with a periodic repetition of a known pseudo-random sequence comprising:

means for producing a local repetition of said pseudo-random sequence;

means for receiving and correlating said high frequency wave trains with the local repetition of the known pseudo-random sequence, supplying at least one correlation signal;

means responsive to said correlation signal for shifting said local repetition of the pseudo-random sequence into substantial time-coincidence with the received repetition of the known pseudo-random sequence; and means for transmitting in reply, during repetitive second time-periods, second high frequency wave trains of the same predetermined carrier frequency being phase reversal modulated in accordance with said local repetition of the known pseudo-random sequence thus shifted, each said second time period for reply extending after and disjointed from an associated one of said first time periods.

14. A transponder, in accordance with claim 13, wherein the time interval between each first time period and the adjacent second time period for reply thereto equals a predetermined whole number of periods of said pseudo-random sequence.

* * * * *